United States Patent
Grant et al.

[11] Patent Number: 5,486,221
[45] Date of Patent: Jan. 23, 1996

[54] SHEAR MECHANISM FOR GLASS FORMING MACHINE

[75] Inventors: Marty J. Grant, Kensington; Steven J. Pinkerton, Avon, both of Conn.

[73] Assignee: Emhart Glass Machinery Investments Inc., Wilmington, Del.

[21] Appl. No.: 814,121

[22] Filed: Dec. 24, 1991

[51] Int. Cl.$^6$ ............................... C03B 7/10; B26D 5/08
[52] U.S. Cl. .................. 65/163; 65/160; 65/334; 65/DIG. 13; 83/354; 83/623
[58] Field of Search .................. 65/334, 332, 164, 65/DIG. 13, 160, 163; 83/354, 623

[56]  References Cited
U.S. PATENT DOCUMENTS

| | | | |
|---|---|---|---|
| 4,174,647 | 11/1979 | Dahms | 83/623 |
| 4,459,146 | 7/1984 | Farkas et al. | 65/159 |
| 4,467,431 | 8/1984 | Gardner et al. | 65/164 |
| 4,699,643 | 10/1987 | Kulig | 65/334 |
| 4,813,994 | 3/1989 | Kulig | 65/167 |
| 4,859,227 | 8/1989 | Wright | 65/332 |
| 4,961,773 | 10/1990 | Takahara et al. | 83/623 |

*Primary Examiner*—David L. Lacey
*Assistant Examiner*—Steven P. Griffin
*Attorney, Agent, or Firm*—Spencer T. Smith

[57]  ABSTRACT

Opposed shear assemblies are conjointly driven via a rack and pinion assembly by a servo motor which follows a displacement profile. When the cycle rate exceeds a selected limit the profile is scaled to reduce peak motor velocity and a shorter stroke is defined.

3 Claims, 3 Drawing Sheets

SHEAR MECHANISM FOR GLASS FORMING MACHINE

BACKGROUND OF THE INVENTION

In conventional individual section (I.S.) glassware forming machines, glassware is formed from discrete gobs sheared by reciprocating opposed shears from a runner of molten glass delivered by a feeder. The length and width of a gob generally corresponds to the height and circumference of the formed glassware.

Conventional shears have a fixed stroke which is large enough for the largest container. This means that the stroke is larger than necessary for smaller gobs. Smaller glassware takes less time to form than does large glassware and as a result, machine speed can be increased as gob size decreases. To date, it has not been possible to drive these mechanisms at the high cycle rates which are possible for smaller gobs.

It is accordingly an object of the present invention to operate the shears at very high cycle rates.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings.

DESCRIPTION OF THE PREFERRED EMBODIMENT

Figure 1:
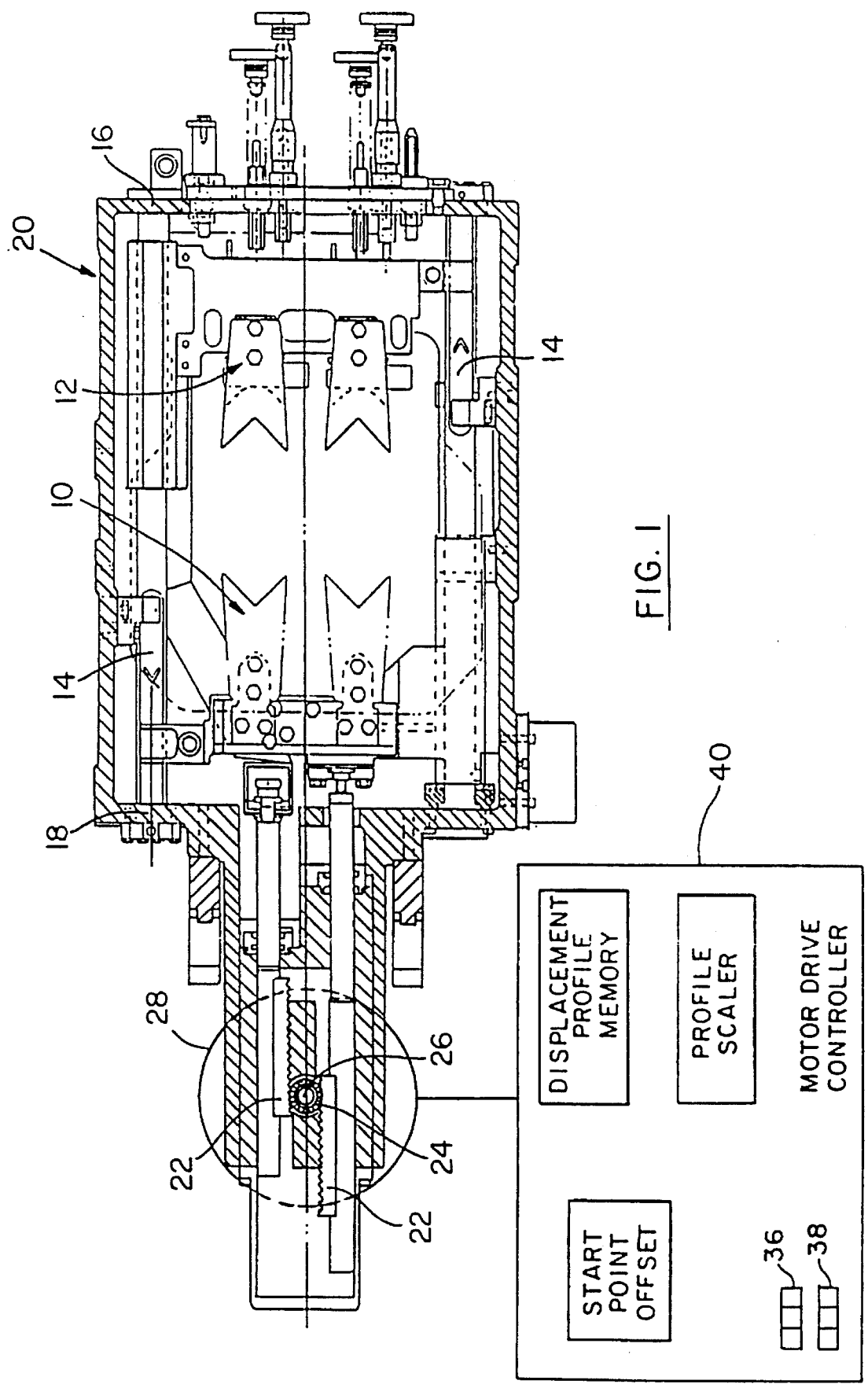
FIG. 1 is a top view of a shear mechanism made in accordance with the teachings of the present invention.

Opposed shear assemblies 10, 12 are mounted for reciprocation on a pair of guide rails 14 which extend between the front 16 and rear walls 18 of the frame 20. These assemblies are conjointly driven by a rack and pinion assembly having a pair of racks 22, one connected to each shear assembly and a central pinion 24. The pinion is connected to the rotating drive shaft 26 of a servo motor 28, which is driven by a motor drive controller 40.

Figure 2:
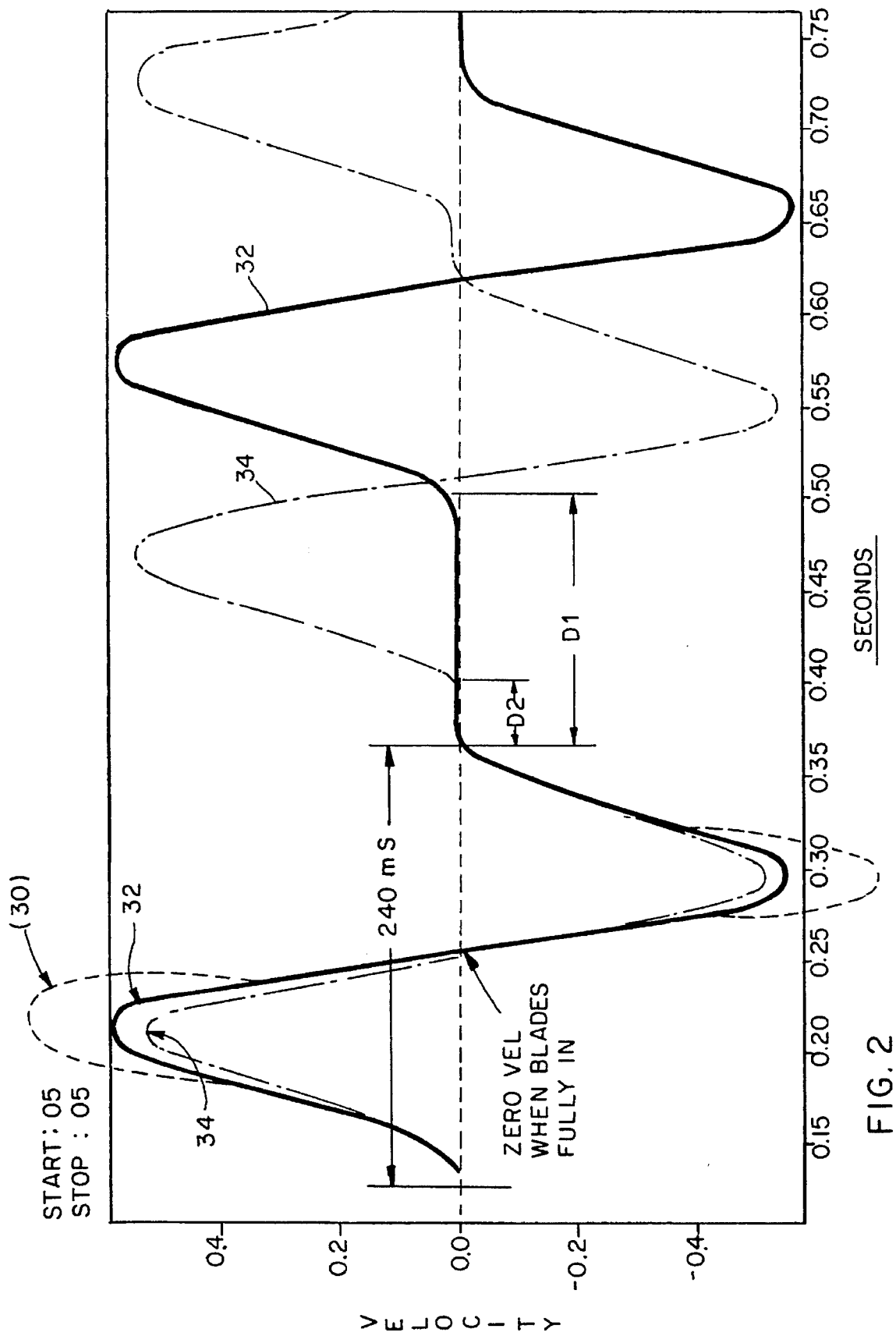
FIG. 2 is a velocity profile for the servo motor during displacement of the mechanism.
Figure 3:
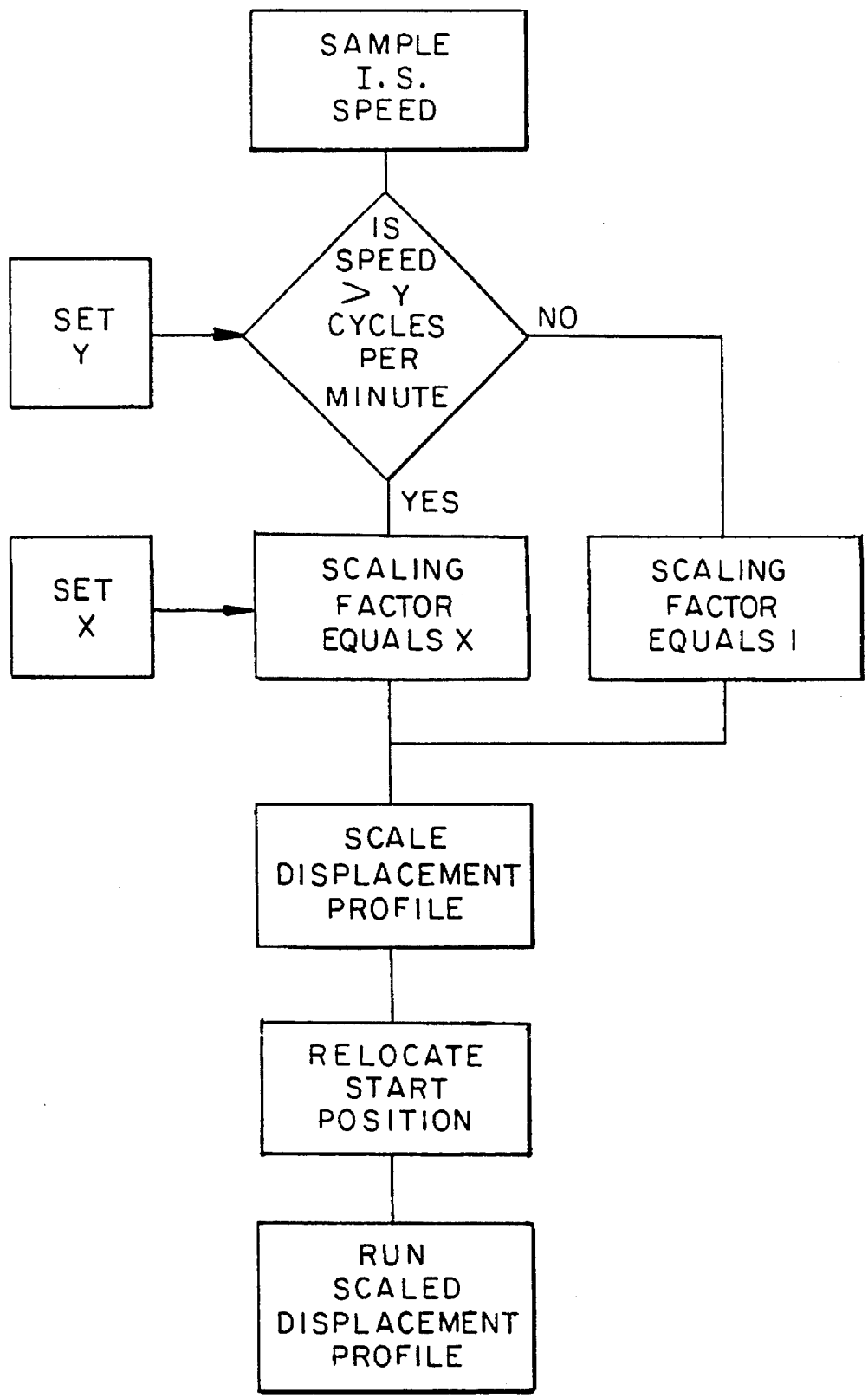
FIG. 3 is a logic diagram for the shear mechanism motor drive controller.

FIG. 2 presents a motor velocity versus time plot showing the motor velocity during the cyclic reciprocation of the shears between retracted and advanced positions. The dotted profile 30 illustrates the profile that might be required if the shears were to operate through a four inch stroke on all sizes of ware at cycle speeds beyond 200 cycles per minute. The top velocity is beyond the servo motors specification (the motor would have a higher root mean square (RMS) current and torque than its specification) and use in this manner would damage the motor. The solid profile 32 represents a velocity profile that is within the desired operating range of the servo motor. This profile which defines one cycle of motor velocity over a fixed time period (240 milliseconds) will displace the shear a predetermined distance or stroke (4 inches) from a retracted position to an advanced position where the blades are fully in and then back to the retracted position. This profile will enable cycle rates up to 190 cycles per minute.

Whenever cycle rate is increased beyond a selected rate (190 cycles per minute in the illustrated embodiment) the stroke is reduced to 3¾" (0.9375×4) by scaling this profile by this same percentage (93.5%). The percentage by which the profile is scaled is selected so that the cycle rate can be increased to 240 cycles per minute without causing the servo motor to operate beyond its operating limit. Broken line 34 represents this scaled profile. Both the maximum cycle rate (Y) and the scaling percentage (X) could be set as desired with conventional rate 36 and scaling factor 38 inputs which are shown schematically in FIG. 1.

The motor drive controller 40 samples the speed of the associated I.S. machine and determines whether the machine speed exceeds the maximum set cycle rate (Y). If not the scale is 1 and the existing displacement profile which is stored in the displacement profile memory of the motor drive controller controls the displacement of the shears between end points which define the longer stroke. If the cycle rate exceeds this maximum, the displacement profile is scaled by the profile scaler of the motor drive controller, the start position is relocated for the shorter stroke and the displacement profile is run. D1 and D2 are the dwell times that will occur between cycles in the long and short stroke modes.

We claim:

1. A shear mechanism for shearing discrete gobs from at least one runner of molten glass comprising a pair of opposed shear assemblies mounted for reciprocating displacement, means for conjointly displacing said shear assemblies including a servo motor, means for controlling the operation of said servo motor including means for storing a displacement profile for displacing said shear assemblies a predetermined stroke from a retracted location to an advanced shearing location, means for determining whether the cycle rate of said shear assemblies is above or below a selected rate, means for scaling said displacement profile by a selected percentage when cycle rate exceeds said selected rate so that said shear assemblies will be displaced a stroke which is said selected percentages of said predetermined stroke, and means for relocating said retracted location by the difference between the length of said predetermined and scaled strokes to maintain said advanced shearing location.

2. A shear mechanism according to claim 1, further comprising means for defining said selected cycle rate.

3. A shear mechanism according to claim 1, further comprising means for defining said selected scaling percentage.

* * * * *